US009362968B1

(12) United States Patent
Haymond (10) Patent No.: US 9,362,968 B1
(45) Date of Patent: Jun. 7, 2016

(54) ADHESIVE POCKET WITH A FINGER TETHER STRAP FOR A CELLULAR PHONE

(71) Applicant: American Covers, Inc., Draper, UT (US)

(72) Inventor: Bryce Haymond, Pleasant Grove, UT (US)

(73) Assignee: American Covers, Inc., Draper, UT (US)

( * ) Notice: Subject to any disclaimer, the term of this patent is extended or adjusted under 35 U.S.C. 154(b) by 0 days.

(21) Appl. No.: 14/749,018

(22) Filed: Jun. 24, 2015

(51) Int. Cl.
*H04M 1/00* (2006.01)
*H04B 1/3827* (2015.01)
*H04M 1/02* (2006.01)

(52) U.S. Cl.
CPC .............. *H04B 1/385* (2013.01); *H04M 1/0281* (2013.01); *H04M 1/0283* (2013.01); *H04B 2001/3861* (2013.01)

(58) Field of Classification Search
CPC ....... A45C 11/18; H04B 1/385; H04B 1/3888
USPC ................ 455/575.6; D3/247, 249; D14/345, D14/138 R; 361/679.03; 224/217, 280, 930
See application file for complete search history.

(56) References Cited

U.S. PATENT DOCUMENTS

| 5,080,223 | A | 1/1992 | Mitsuyama |
| 5,832,540 | A | 11/1998 | Knight |
| 5,924,136 | A | 7/1999 | Ogean |
| 5,941,375 | A | 8/1999 | Kamens et al. |
| 6,321,907 | B1 | 11/2001 | Honstrater |
| 6,616,111 | B1 | 9/2003 | White |
| D554,950 | S | 11/2007 | Richmond |
| D626,119 | S | 10/2010 | Fellig |
| D631,246 | S | 1/2011 | Boettner |
| 8,047,364 | B2 | 11/2011 | Longinotti-Buitoni |
| 8,181,816 | B2 | 5/2012 | Allen |
| 8,272,507 | B1 * | 9/2012 | Crump et al. ................. 206/223 |
| 8,381,904 | B1 | 2/2013 | Longinotti-Buitoni |
| 2003/0000865 | A1 | 1/2003 | Carlino |
| 2005/0133130 | A1 | 6/2005 | Blum et al. |
| 2005/0205623 | A1 * | 9/2005 | Buntain ........................ 224/217 |
| 2008/0121322 | A1 | 5/2008 | Thomson |
| 2009/0270050 | A1 | 10/2009 | Brown |
| 2010/0294405 | A1 | 11/2010 | Longinotti-Buitoni |
| 2011/0272072 | A1 | 11/2011 | Westover et al. |
| 2011/0284407 | A1 | 11/2011 | Connolly |
| 2012/0168483 | A1 | 7/2012 | Jambunathan et al. |
| 2012/0264491 | A1 | 10/2012 | Singhal |
| 2012/0299318 | A1 | 11/2012 | Murphy et al. |

(Continued)

OTHER PUBLICATIONS

Stixs® Smart Wallet; www.amazon.com/Stixs(R) Wallet Silicone Adhesive Android/dp/B00D3O522Q; Sep. 11, 2013;4pages;3M Silicone.*

(Continued)

*Primary Examiner* — Nay A Maung
*Assistant Examiner* — Angelica M Perez
(74) *Attorney, Agent, or Firm* — Thorpe, North & Western, LLP (57) ABSTRACT

A pocket is fixed to a cellular phone and has a pouch removably receiving a rectangular card to selectively couple the rectangular card to the cellular phone. The pouch has inner and outer panels, and a pair of elongated slots formed in the outer panel to form an elongated strap therebetween with opposite distal ends attached to and formed with the outer panel.

20 Claims, 9 Drawing Sheets

(56) References Cited

U.S. PATENT DOCUMENTS

2013/0037187 A1    2/2013    D'Amore et al.
2014/0166706 A1    6/2014    Leisey-Bartsch

OTHER PUBLICATIONS

HandStands, Randombuy. www.randombuy.com/collections/handstands, Nov. 26, 2014. 2 pp. (2 separate sections).*

Card Ninja®; How Does Card Ninja wallet work?; http://www.cardninja.com/pages/learn-more ; 3 pages; Upon information and belief, available prior to May 3, 2013.

Lap Works 2Loop iPad handle for iPad 2,3 & 4 with two finger loops and multi-positional support arm with silicone case and 360 degree swivel; accessed Apr. 9, 2015; 6 pages. http://www.amazon.com/LapWorks-2Loop-iPad-Handle-Multi-Positional/dp/B00612I1VQ.

Lap Works handle iPad strap & desk mount that swivels and no-grip iPad holder with desktop stand; accessed Apr. 9, 2015; 6 pages. http://www.amazon.com/LapWorks-Handler-Swivels-No-Grip-Adjustable/dp/B005STNDHA/ref=pd_sim_e_2?ie=UTF8&refRID=0TJBJQ43A8NS603PP24Y.

Matte Silver i+ bunker ring 3-anit drop ring for iPhone 5 4S 4 3GS the new iPad 2 3iPad mini kindle fire touch Samsung galaxy S3 S2 note note2 nexus note epic touch 4G HTC EVO 4G rhyme Droid razr bionic incredible 2 semi permanent adhesive 360 degree rotatable; accessed Apr. 9, 2015; 2 pages. http://www.amazon.com/MATTE-SILVER-Plus-Bunker-Ring/dp/B00KEWM3VS/ref=pd_cp_cps_3.

New Trent Gladius iPad case compatible with iPad $3^{rd}$, and iPad $2^{nd}$ Gen. 360 degree rotatable with genuine leather hand strap and movie stand; accessed Apr. 9, 2015; 6 pages. http://www.amazon.com/New-Trent-Gladius-iPad-compatible/dp/B005PSQ5TM/ref=pd_sim_e_1?ie=UTF8&refRID=0TJBJQ43A8NS603PP24Y.

Nonslip finger ring for protecting cell phone; accessed Apr. 9, 2015; 3 pages. http://www.alibaba.com/product-detail/Nonslip-Finger-Ring-for-Protecting-Cell_121932769.html.

Sinji Pouch; sinjimoru.com/blog/uk/2012/05/09/Basic; 2 pages.

Stixs® Smart Wallet; www.amazon.con/Stixs®-Wallet-Silicone-Adhesive-Android/dp/ B00D3O522Q; 4 pages; 3M Silicone, Sep. 11, 2013.

Universal silver bunker ring stand & holder for iPhone 4 4S 5 5G galaxy S2 S3 SIII S4 iPad iPod HTC nokia all cell phones; accessed Apr. 9, 2015; 6 pages. http://www.amazon.com/Universal-Silver-Bunker-Holder-iPhone/dp/B00DI2OF12/ref=sr_1_4?s=wireless&ie=UTF8&qid=1404919723&sr=1-4.

* cited by examiner

ADHESIVE POCKET WITH A FINGER TETHER STRAP FOR A CELLULAR PHONE

PRIORITY CLAIM(S) & RELATED APPLICATION(S)

This is related to U.S. patent application Ser. No. 14/046,573, filed Oct. 4, 2013, which is hereby incorporated herein by reference.

This is related to U.S. patent application Ser. No. 14/499,032, filed Sep. 25, 2014, which is hereby incorporated herein by reference.

BACKGROUND

1. Field of the Invention

The present invention relates generally to cell phone accessories. More particularly, the present invention relates to a pocket or wallet adhered to the cell phone to provide a way to minimize the quantity of items a user carries while making those items easier to locate and access, and to provide a way to tether the cellular phone to the user's hand.

2. Related Art

People often carry a cellular phone in addition to other items, such as a wallet or purse, and the items therein, such as personal identification cards, driver's license, credit/atm cards, cash, keys, etc. It has been proposed to secure a pouch to a cellular phone. These pouches adhere to an outer surface of a cellular phone and can carry credit cards or other similar payment cards, identification or other similar cards, or other small objects. For example, see the iRoo card pouch attachment by Kena Kai, or the Stixs card carrying pouch, or the Sinji Pouch by Sinjimoru, or the CardNinja® by Wallaroo LLC. In addition, see US Patent Publications 2013/0037187; 2012/0168483; and 2005/0133130; and U.S. Pat. No. 8,047,364.

SUMMARY OF THE INVENTION

It has been recognized that it would be advantageous to develop an adhesive pocket that provides a way to minimize the quantity of items a user carries while making those items easier to locate and access; and provides a tether for the cell phone.

The invention provides a pocket device to be affixed to a cellular phone and to receive a rectangular card to selectively couple the rectangular card to the cellular phone. The pocket device comprises a pouch formed by inner and outer planer, rectangular panels, and a perimeter wall extending between the panels around a majority of a perimeter of the panels. A planer, rectangular hollow is formed between the inner and outer panels and the perimeter wall to removably receive the rectangular card therein. An open end is formed between short sides of the inner and outer panels, and extends to the hollow to removably receive the rectangular card therethrough. An inner finger notch is formed in the short side of the inner panel adjacent the open end. An adhesive is disposed on an exterior surface of the inner panel to adhere the pouch to the cellular phone. A pair of elongated slots is formed in the outer panel. The pair of slots is spaced-apart from one another to form an elongated strap therebetween with opposite distal ends attached to and formed with the outer panel. The pair of slots defines finger openings to removably receive a user's finger. The strap is flexible to bend away from the outer panel and elastic to return to a flat configuration. The strap has at least two positions, including: 1) a non-use position in which the strap is relaxed and planar and flush with the outer panel; and 2) a use position in which the strap is stretched and arcuate and bowed away from the outer panel configured to receive the user's finger through the pair of slots and between the strap and the hollow configured to tether the pouch, and thus the cellular phone, to the user's finger.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "cell phone" and "cellular phone" are used interchangeably herein to refer broadly to a cellular phone, smart phone, phablet, or other handheld electronic device. In addition, the terms "cell phone" or "cellular phone" include any protective or decorative case or skin or film attached to the cellular phone. For example, the phrase "attached to a cellular phone" is intended to mean directly attached to the cellular phone, as well as indirectly attached by way of being attached to a protective or decorative case, skin or film.

The term "rectangular" is used herein to refer to a rectangular shape with a length greater than a width, and thus having a pair of parallel long sides, and pair of parallel short sides perpendicular to the long sides. The rectangular shape can have beveled, chamfered or radius or rounded corners. Examples of rectangular or rectangular shape include credit cards, driver's licenses, and the like.

The term "rectangular card" is used herein to refer to a credit card(s), a bank card, a debit card, a driver's license, an identification card, a membership card, a key card, currency folded multiple times, and the like.

The term "indicia" is used herein to refer to a visual element(s) that can convey information. The indicia can be embossed or raised, or debossed or lowered, in the material. The indicia can be formed by ink printed on the material or surface. The indicia can be indicative of or representing a business (or company or organization), a product or service, or both, such as a logo, message, slogan, etc. The logo or indicia can be or can include letters, symbols, figures, pictures, logos, art, corporate messages, slogans, bi-lines, icons, etc. that are associated with or that form a representation of a business, company or organization or the like, or a product, service or the like, or both. Thus, the indicia indicative of or representing a business (or company), a product, or both, such as a logo, is presented to the user, and thus becomes a promotion. Thus, the pocket device can be a promotional item and can be provided by businesses, corporations or other organizations, with indicia indicative of or representing a business (or company or organization), a product or service, or both, such as a logo, message, slogan, etc. The pocket devices can be inexpensively manufactured, and in use, can occupy a position of high and frequent visibility. Thus, the pocket devices can be inexpensively manufactured, and given away as promotional items. In addition, the indicia can include instructions or directions for use, orientation, care, warnings, etc. The indicia can include instructions that can be related or unrelated to the use or care of the pocket device. For example, the instructions can include how to use or place the pocket device and/or tether, and how to clean or wash the pocket device and/or tether. As another example, the instructions can relate to the use of something other than the pad itself, such as an item to be disposed thereon or therein.

DESCRIPTION

As illustrated in FIGS. 1-6, a pocket device 10 in an example implementation in accordance with the invention is shown that can be affixed or releasably adhered to a cellular phone 14, or case thereof. The pocket 10 has a pouch 18 therein that is sized and shaped to removably receive items therein, such as a rectangular card 22. The rectangular card can be a credit or debit card, cash, a driver's license, etc. Thus, the pocket can selectively couple the item or rectangular card to the cellular phone. The pouch can be formed between inner and outer panels or layers 26 and 28 with a hollow 32 therebetween to hold the item or rectangular card 22 in the pouch. A pair of slots 36 and 38 can be formed in the outer panel 28 to form a strap 42 in the outer panel 28. A user's finger 46 can be inserted under the strap 42 to tether the pocket 10, and thus the cellular phone 14, to the user's finger. The pocket device can be made of silicone, and inexpensively molded as a single, unitary, monolithic body. In addition, the pocket device can be provided with indicia that is indicative of or representing a business (or company or organization), a product or service, or both, such as a logo, message, slogan, etc. Thus, the pocket device can be utilized as a promotional device, and given away by companies or organizations to promote products or services. The pocket device is positioned on cellular phone, and thus positioned for ready and frequent viewing by a user.

The pocket 10 can have or can be a pouch 18 formed by the inner and outer panels 26, and 28 and a perimeter wall 50 extending between the panels, and around a majority of a perimeter of the panels. The inner and outer panels 26 and 28 can be planer and rectangular panels spaced-apart from one another. The panels can have long sides, parallel and spaced-apart from one another, and short sides parallel and spaced-apart from one another, and perpendicular with the long sides. The panels and the perimeter wall can be formed of silicone, and can be formed or molded in a mold as a single, unitary, monolithic body. For example, the panels and the perimeter wall can be formed integrally together at the same time by introducing silicone into a mold. The panels and the perimeter wall can form or define the hollow 32 therebetween. The hollow 32 can be a planer and rectangular hollow, formed between the panels and the perimeter wall. The pocket, pouch and/or hollow can removably receive one or more rectangular cards 22. The hollow can have a thickness between the panels sized the same or slightly less than a thickness of the rectangular card to grip the card between the panels, and/or to hold the rectangular card by friction between the surface of the card and interior surfaces of the panels. The pocket, pouch and/or body can be flexible and resilient, so that it can stretch to receive the rectangular card. An exterior surface of the inner panel 26 can have an adhesive 50 disposed thereon to adhere the pouch to the cellular phone. The adhesive can be a removable or temporary adhesive to removably adhere the pouch to the cellular phone.

Figures 1, 2, 9:
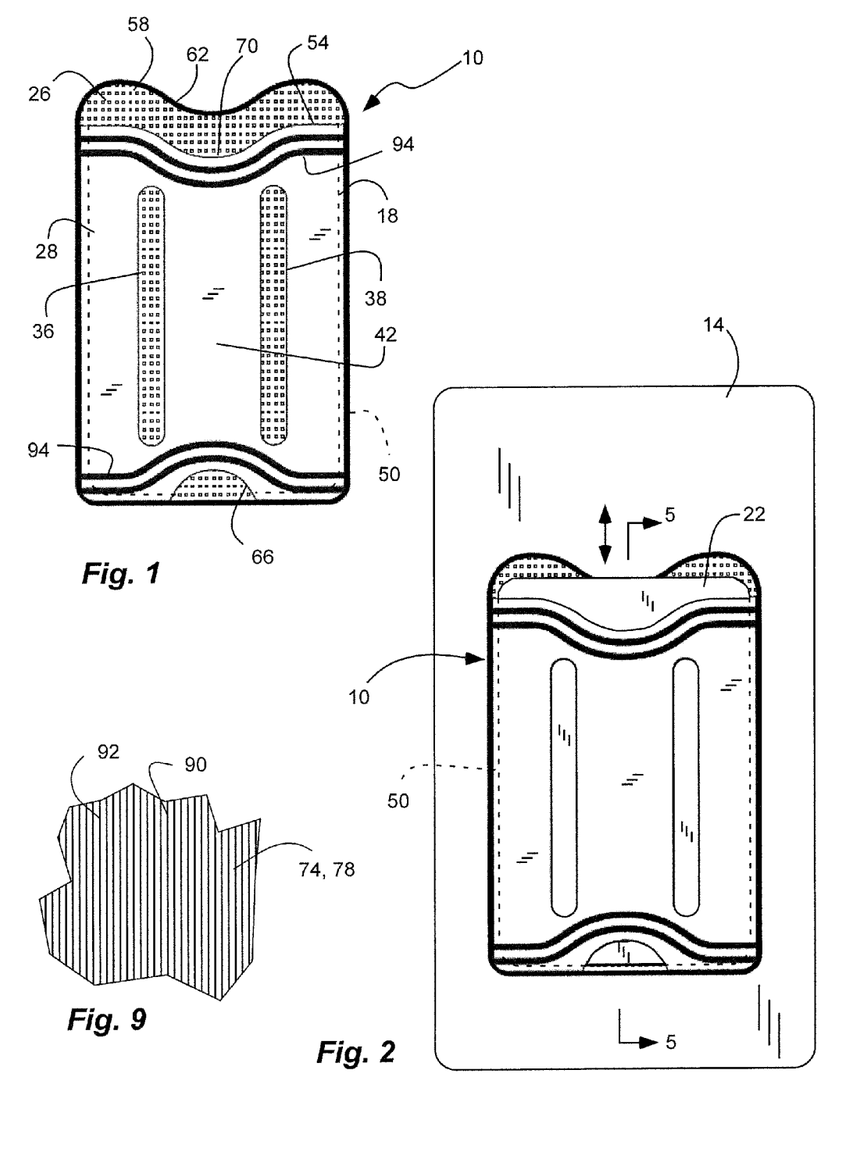
FIG. 1 is a front view of a pocket device in accordance with an embodiment of the present invention.
FIG. 2 is a front view of the pocket device of FIG. 1, shown affixed to a cellular phone and shown removably receiving a rectangular card to selectively couple the rectangular card to the cellular phone.
FIG. 9 is a front view of an inner surface of either or both of inner and/or outer panels of the pocket device of FIG. 1, showing a plurality of indentations.
Figures 3, 4, 5:
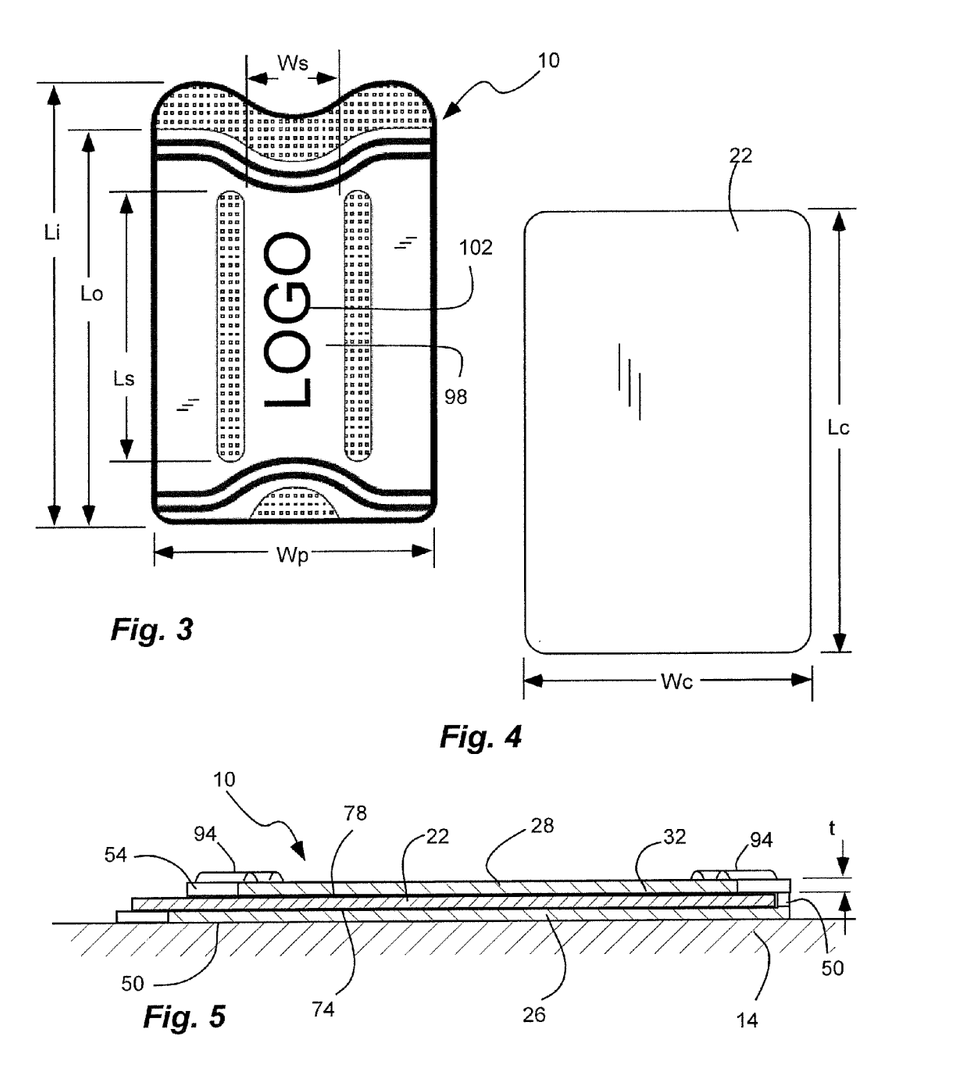
FIG. 3 is a front view of the pocket device of FIG. 1.
FIG. 4 is a front view of the rectangular card.
FIG. 5 is a cross-sectional view of the pocket device of FIG. 1 taken along line 5-5 in FIG. 2, shown affixed to the cellular phone and shown removably receiving the rectangular card to selectively couple the rectangular card to the cellular phone.

The pocket 10, pouch 18 and/or hollow 32 can have an open end 54 formed between short sides of the panels 26 and 28, and extending to the hollow 32. In addition, the pocket 10, pouch 18 and/or hollow 32 can have a closed end opposite the open end. The open and closed ends can be formed in the short ends of the rectangular panels. The closed end can be substantially closed, or mostly closed with a majority thereof closed. While the open end can be substantially open, or mostly open with a majority thereof open. The lateral sides can be substantially or mostly closed. The inner panel can be substantially or mostly closed, or entirely closed. The open end can be a proximal end of the pocket, pouch, hollow and panels; while the closed end can be a distal end of the pocket, pouch, hollow and panels. The open end 54 can removably receive the rectangular card 22 therethrough and into the hollow.

The inner panel 26 can have a length Li approximately the same length Lc as the rectangular card 22. The length Li of the inner panel 26 can be slightly greater than the length Lc of the rectangular card 22 to account for the width of the perimeter wall 50 at the distal end or closed end of the pouch. Thus, the inner panel 26 can separate the rectangular card 22 from the cellular phone 14 along the entire length of the card. In addition, outer panel 28 can have a length Lo that is less than the length Li of the inner panel 26, and less than the length Lc of the rectangular card 22. Thus, the proximal end of the inner panel 26 extends beyond the proximal end of the outer panel 28 at the open end 54 or proximal end of the pouch to create a tab 58. The tab 58 can identify the open end 54 of the pouch, and can facilitate insertion of the card into the pouch or hollow. In addition, a small portion of the rectangular card can extend from the open end 54 to facilitate removal thereof. The distal ends of the panels 26 and 28 can be co-extensive or can co-terminate, with one another.

In addition, the inner panel 26 can have an inner finger notch 62 formed in the short side or proximal end of the inner panel adjacent the open end 54. The inner finger notch 62 can receive the user's finger or the user's fingernail inserted therein, and between the cellular phone 14 and the rectangular card 22, to facilitate withdrawing the rectangular card from the hollow 32. The outer panel 28 can have an outer finger notch 66 formed in the outer panel on an opposite short side, opposite the inner notch and the open end, or at the distal end or closed end. The outer finger notch 66 can receive the user's finger or the user's fingernail inserted therein and into the outer finger notch, to facilitate sliding the rectangular card out of the hollow through the open end. In one aspect, the outer panel 28 can further have another outer finger notch 70 at the open end to facilitate removal of the card.

Figure 7:
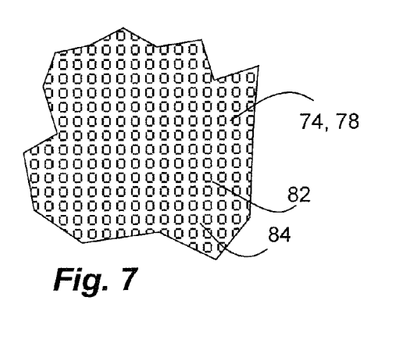
FIG. 7 is a front view of an inner surface of either or both of inner and/or outer panels of the pocket device of FIG. 1, showing a plurality of indentations.
Figure 8:
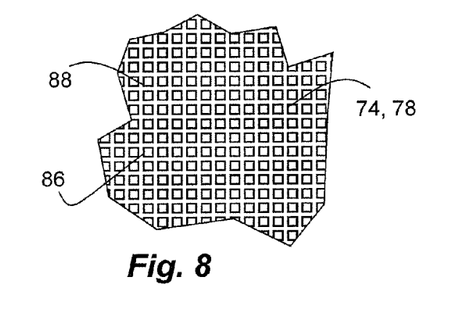
FIG. 8 is a front view of an inner surface of either or both of inner and/or outer panels of the pocket device of FIG. 1, showing a plurality of protrusions.

The inner or interior surfaces 74 and 78 of the hollow 32 or panels 26 and 28 can be textured to reduce the outermost surface area contacting the rectangular card, and thus reduce friction to facilitate removal of the rectangular card from the hollow. In one aspect, the texture can be formed by a plurality of indentations 82 (FIG. 7) extending into the surfaces to form a continuous outermost surface 84 that is interconnected (but discontinuous indentations that are not interconnected). The indentations can be arranged in a matrix. In another aspect, the texture can be formed by a plurality of protrusions 86 (FIG. 8) extending from the surface to form a discontinuous outermost surface 88 (but a continuous indentation that is interconnected). The protrusions can be arranged in a matrix. In another aspect, the texture can be formed by an array of linear indentation and/or protrusions 90 (FIG. 9) to form an outermost surface 92 that is segmented and discontinuous. In one aspect, an inner surface 74 of the inner panel 26 facing into the hollow 32 can have a texture defining an outermost contact surface in contact with the rectangular card 22, and with a surface area less than a surface area of the inner panel. In another aspect, an inner surface 78 of the outer panel 28 facing into the hollow 32 has a texture defining an outermost contact surface in contact with the rectangular card 22, and with a surface area less than a surface area of the outer panel.

As mentioned above, the pocket 10, pouch 18 and/or outer panel 28 has a pair of elongated slots 36 and 38 formed in the outer panel, and extending to the hollow 32. The pair of slots can be spaced-apart from one another. In addition, the pair of slots can be parallel with one another, and parallel with the long side of the panels. The pair of slots forms an elongated strap 42 therebetween. The strap 42 has opposite distal ends attached to and formed with the outer panel 28. The strap 42 can be aligned parallel with the long side of the panels. In addition, the pair of slots defines finger openings configured to removably receive a user's finger 46. The pair of slots, and the strap, can each have a length Ls greater than half of a length Lo of the outer panel 28 (Ls>Lo/2), and less than a length Lc of the rectangular card 22 (Ls<Lc). Thus, the slots are large enough to receive a user's finger 46, and small enough not to inadvertently release the card therethrough. In addition, the strap 42 is long enough to accommodate the user's finger 46. The strap 42 can have a width Ws greater than one-third of a width Wp of the panels (Ws>Wp/3), and less than a width Wc of the rectangular card 22 (Ws<Wc). Thus, the strap 42 is broad enough to resist twisting, and to provide coverage for the card. The outer panel 28 and the strap 42 can have a thickness of at least 0.04 inches (1 mm) to support bending and flexing of the strap (of silicone) without breaking. In addition, the pair of slots 36 and 38 can have radiused or curved end to reduce stress points when the strap is flexed. The pocket or pouch can have an overall thickness less than 0.20 inches (5 mm) in one aspect, and 0.15 inches (3.8 mm) in another aspect, so that the pocket or pouch reduces interference with use of the cellular phone, while still providing a strap and a pouch.

Figure 6:
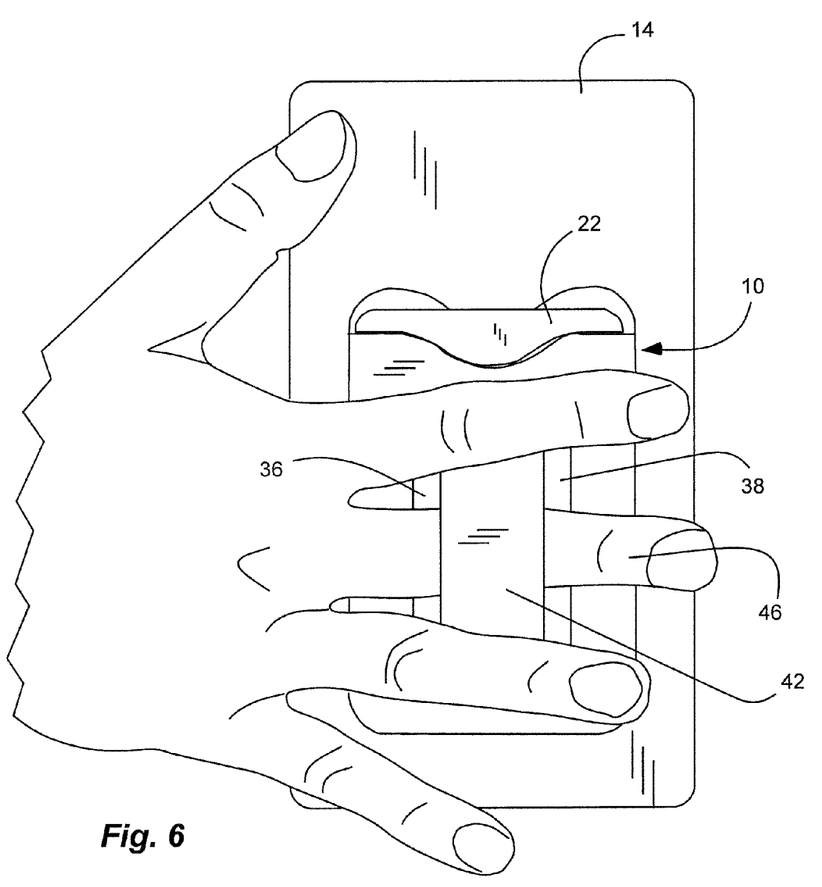
FIG. 6 is a front view of the pocket device of FIG. 1, shown affixed to the cellular phone and shown removably receiving the rectangular card to selectively couple the rectangular card to the cellular phone, and shown with a user's finger through a pair of slots and between a strap and a hollow to tether the pocket device, and thus the cellular phone, to the user's finger.

The strap 42 is flexible to bend away from the outer panel 28 to accommodate the user's finger, and elastic to return to a flat configuration when the user's finger is withdrawn so that the pocket remains flat. The strap 42 can have at least two positions, including: a non-use position; and a use position. In the non-use position, the strap 42 is relaxed and planar and flush with the outer panel 28, as shown in FIG. 1. In the use position, the strap 42 is stretched and arcuate and bowed away from the outer panel 28 to receive a user's finger 46 through the pair of slots 36 and 38, and between the strap 42 and the hollow 32, to tether the pouch, and thus the cellular phone, to the user's finger.

Furthermore, the pocket or pouch can have a grip surface to resist sliding when placed on a support surface. The pocket or pouch can include a grip layer 94 disposed on the outer panel 28, or exterior surface thereof. The grip layer 94 can comprise a plurality of protrusions disposed on the external surface of the outer panel. In one aspect, the grip layer and/or protrusions can comprise silicone, and can be formed with and integral with the outer panel. In another aspect, the grip layer and/or the protrusions can comprise a different material than the outer panel. The strap 42 can have an open area 98 on the strap and exposed by the grip layer 94. The open area 98 can expose a majority of the strap. The strap 42 can have indicia 102 disposed on the strap in the open area 98. As described above, the indicia 102 can be indicative of or representing a business (or company or organization), a product or service, or both, such as a logo, message, slogan, etc.

A method for selectively tethering the cellular phone 14 to the user's finger 46 with the pocket device 10 as described above comprises: 1) inserting the user's finger 46 into a first of the pair of slots 36, under the strap 42, and out of a second of the pair of slots 38 so that the pocket 10, and thus the cellular phone 14, is carried by the user's finger 46, and displacing the strap 42 from the non-used position to the used position; and 2) withdrawing the user's finger 46 from the second of the pair of slots 38, from under the strap 42, and from the first of the pair of slots 36, and allowing the strap 42 to return to the non-used position.

A method for selectively coupling the rectangular card 22 to the cellular phone 14 with the pocket device 10 as described above comprises: 1) inserting the rectangular card 22 through the open end 54 and into the hollow 32; 2) inserting the user's finger 46 or a user's fingernail into the outer finger notch 66 and sliding the rectangular card 22 out of the hollow 32 through the open end 54; and 3) inserting the user's finger 46 or the user's fingernail between the cellular phone 14 and the rectangular card 22, and withdrawing the rectangular card 22 from the hollow 32.

Figure 10:
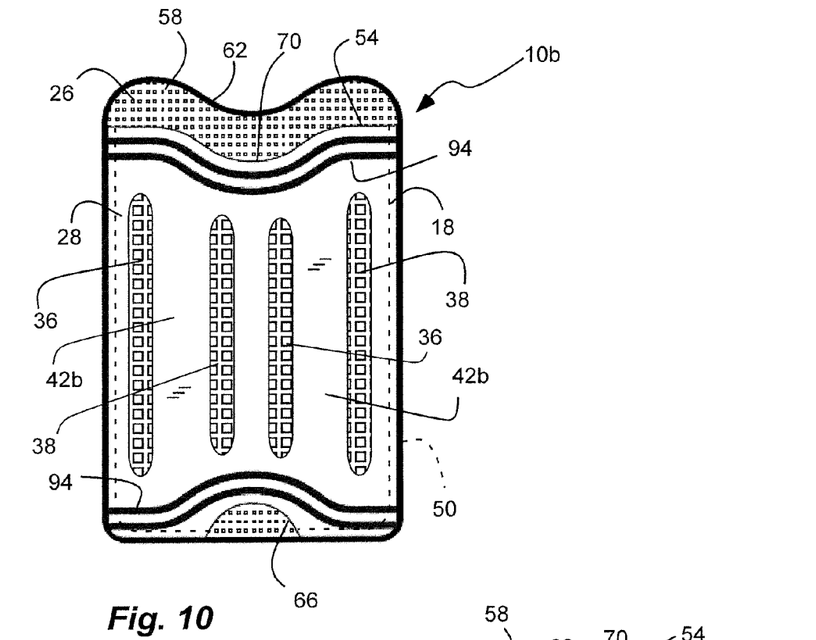
FIG. 10 is a front view of another pocket device in accordance with another embodiment of the present invention.

As described above, in one aspect, the pocket 10 can have a single strap 42. In another aspect, the pocket can have one or more straps, such as a pair of straps. Referring to FIG. 10, another pocket device 10b is shown that is similar in many respects to that described above, and which description is hereby incorporated herein by reference. The pocket 10b can have four slots, or two pairs of slots 36 and 38, formed in the outer panel 28 to form a pair of straps 42b in the outer panel 28. A user's finger can be inserted under the straps 42b to tether the pocket 10b, and thus the cellular phone 14, to the user's finger. The pair of straps can be spaced apart from one another, and can have a greater width than that of a single strap, to provide greater stability and resist pivoting or rotation on the user's finger. In addition, the four slots can provide greater visibility of the card or other contents of the pocket.

Figure 11:
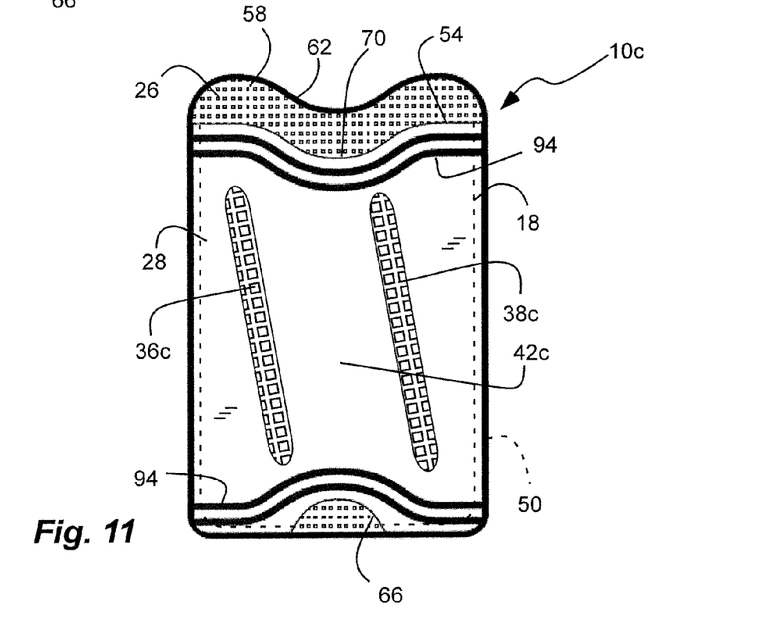
FIG. 11 is a front view of another pocket device in accordance with another embodiment of the present invention.

As described above, in one aspect, the pocket 10 can have a pair of slots 36 and 38, and a strap 42, parallel with one another, and parallel with the long sides of the panels, and a longitudinal axis of the pocket. In another aspect, the slots and/or strap(s) can be oriented at an acute angle with respect to the long sides of the panels, and the longitudinal axis of the pocket. Orienting the strap and an angle can properly or more comfortably orient the cellular phone in the user's hand or palm when the user's finger is inserted through the slots. Referring to FIG. 11, another pocket device 10c is shown that is similar in many respects to that described above, and which description is hereby incorporated herein by reference. The pocket 10c can have a pair of slots 36c and 38c, and a strap 42c, oriented at an acute angle with respect to the long sides of the panels, and the longitudinal axis of the pocket.

Figure 12:
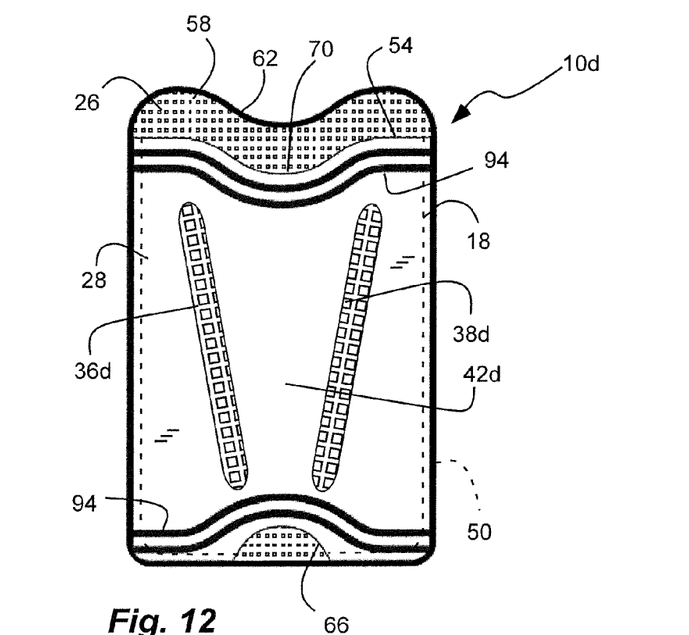
FIG. 12 is a front view of another pocket device in accordance with another embodiment of the present invention.

As described above, in one aspect, the pocket 10 can have a pair of slots 36 and 38, and a strap 42, parallel with one another, and the strap can have a substantially constant width. In another aspect, the slots can be oriented at an acute angle with respect to one another, and the strap can have a tapering width. The tapering width of the strap can provide additional comfort to the user's finger. In one aspect, the strap can have a wider width near the open end, and a narrower width near the closed end. The wider width at the open end can provide less stretching while the narrower width at the closed end can provide greater stretching; and can bias the user's finger towards the closed end. Referring to FIG. 12, another pocket device 10d is shown that is similar in many respects to that described above, and which description is hereby incorporated herein by reference. The pocket 10d can have a pair of slots 36d and 38d oriented at an acute angle with respect to one another. The strap 42d can have a wider width near the open end 54, and a narrower width near the closed end. In another aspect, the strap can have a narrower width near the open end and a wider width near the closed end; to facilitate insertion of the rectangular card into the open end without inadvertently being inserted into one or both of the slots.

Figure 13:
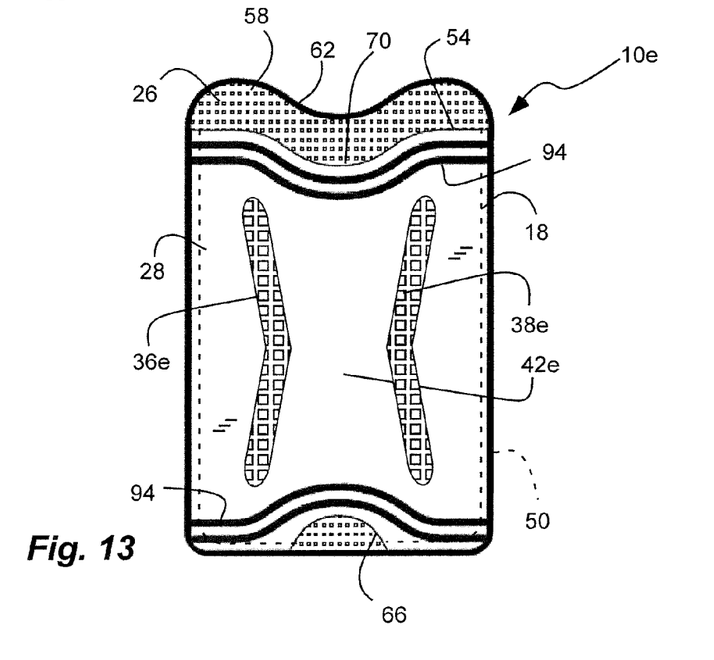
FIG. 13 is a front view of another pocket device in accordance with another embodiment of the present invention.

As described above, in one aspect, the pocket 10 can have a pair of slots 36 and 38, and a strap, that are straight and that have a constant width. In another aspect, the slots can be non-linear, arcuate, and/or angled, and the strap can have a variable width along its length. In one aspect, the slots can be angled (at an obtuse angle with respect to one another), and oriented to be spaced apart further at their ends, and spaced apart narrower intermediate their ends. The strap can have wider ends and a narrower interior or intermediate portion. Thus, the strap can stretch less at the ends, and more in the middle. Such a configuration can bias the user's finger towards a middle of the strap, and/or provide comfort. Referring to FIG. 13, another pocket device 10e is shown that is similar in many respects to that described above, and which description is hereby incorporated herein by reference. The pocket 10e can have a pair of slots 36e and 38e that are angled with respect to one another from an intermediate point to form an obtuse angle with respect to one another. Thus, the slots can have broad V-shapes. The slots can be oriented with their distal ends further apart from one another, and their intermediate points closer to one another, in an hour-glass shape. The strap 42e can have wider ends and a narrower interior or intermediate portion. In another aspect, the slots can be oriented with their distal ends closer to one another, and their intermediate points closer to one another, in a diamond shape. The strap can have narrower ends and a wider interior or intermediate portion. Thus, the strap can stretch more at the ends, and have a wider intermediate portion for greater comfort.

Figures 14, 15:
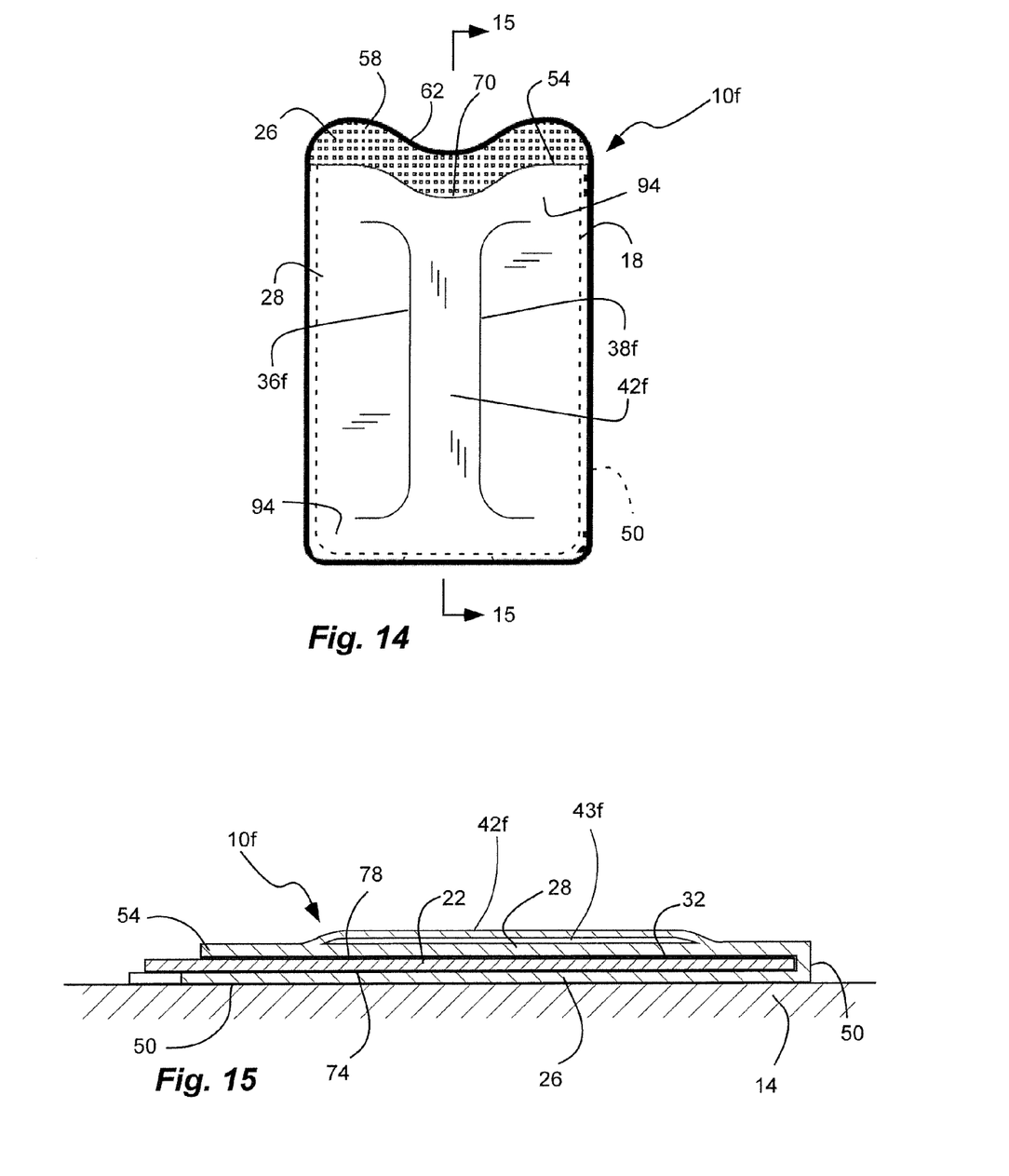
FIG. 14 is a front view of another pocket device in accordance with another embodiment of the present invention.
FIG. 15 is a cross-sectional view of the pocket device of FIG. 14 taken along line 15-15 in FIG. 14, and also shown affixed to the cellular phone and shown removably receiving the rectangular card to selectively couple the rectangular card to the cellular phone.

As described above, in one aspect, the pockets can have a pair of elongated slots formed in the outer panel and extending to the hollow 32, and the strap can be defined between the pair of slots. In another aspect, the strap can be formed integrally with the outer panel 28, and can be molded with the outer panel as a single, unitary, monolithic body. The pair of slots can extend toward one another from opposite sides of the strap to create an aperture between the strap and the outer panel. Thus, the hollow and the card therein can be substantially covered by the outer panel, without exposure by the slots. Referring to FIGS. 14 and 15, another pocket device 10f is shown that is similar in many respects to that described above, and which description is hereby incorporated herein by reference. The pocket 10f can have a strap 42f formed integrally with the outer panel 28, and separated in its interior or intermediate portion from the outer panel by a lateral aperture 43 extending from one side of the strap to the other. The ends of the strap can be integrally formed with the outer panel, while the interior or intermediate portion of the strap is separate from the outer panel. The user's finger can be inserted through the aperture. The aperture 43 can define the pair of slots 36f and 38f on each side of the strap.

Figure 16:
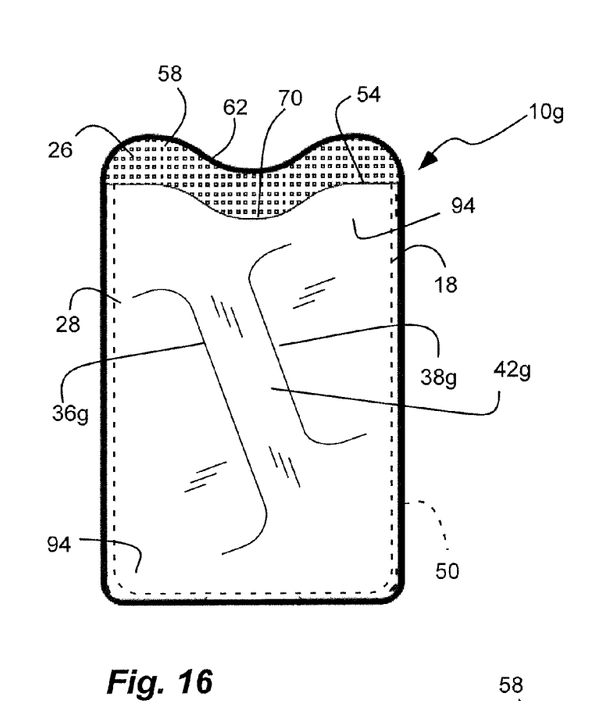
FIG. 16 is a front view of another pocket device in accordance with another embodiment of the present invention.

In one aspect, the strap 42f, and slots 36f and 38f, can be oriented parallel with one another, and parallel with the long sides of the panels, and a longitudinal axis of the pocket. In another aspect, the slots and/or strap(s) can be oriented at an acute angle with respect to the long sides of the panels, and the longitudinal axis of the pocket, as described above. Referring to FIG. 16, another pocket device 10g is shown that is similar in many respects to that described above, and which description is hereby incorporated herein by reference. The pocket 10g can have a strap 42g formed integrally with the outer panel 28, and can be oriented at an acute angle with respect to the long sides of the panels, and the longitudinal axis of the pocket.

Figure 17:
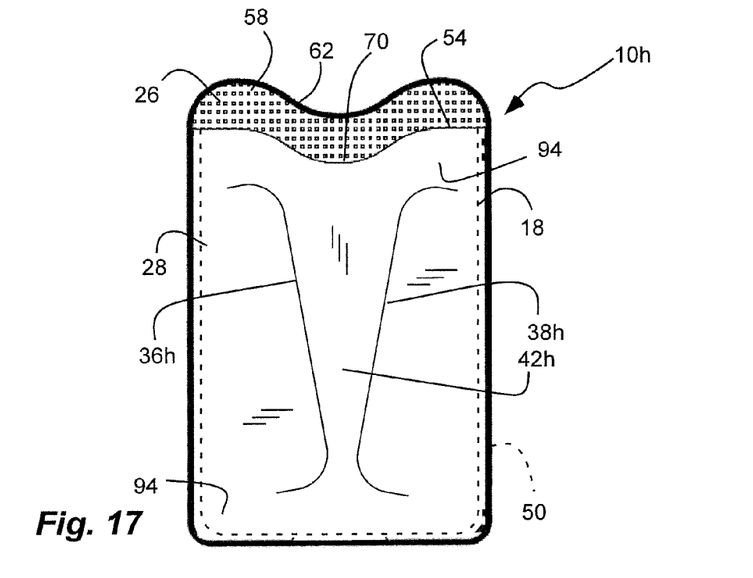
FIG. 17 is a front view of another pocket device in accordance with another embodiment of the present invention.

In one aspect, the slots can be oriented parallel with one another, and the strap can have a substantially constant width. In another aspect, the slots can be oriented at an acute angle with respect to one another, and the strap can have a tapering width, as described above. Referring to FIG. 17, another pocket device 10h is shown that is similar in many respects to that described above, and which description is hereby incorporated herein by reference. The pocket 10h can have a pair of slots 36h and 38h oriented at an acute angle with respect to one another. The strap 42h can have a wider width near the open end 54, and a narrower width near the closed end. In another aspect, the strap can have a narrower width near the open end and a wider width near the closed end.

Figure 18:
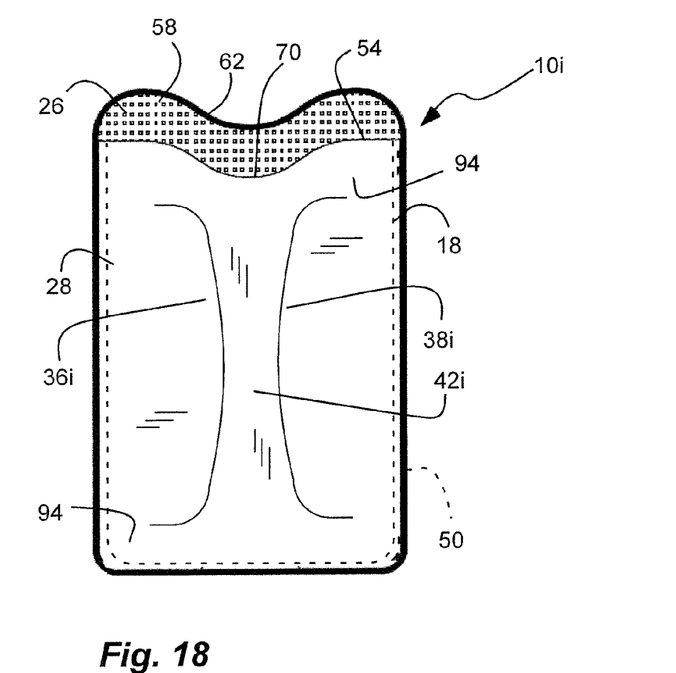
FIG. 18 is a front view of another pocket device in accordance with another embodiment of the present invention.

As described above, in one aspect, the pocket can have a pair of slots, and a strap, that are straight and that have a constant width. In another aspect, the slots can be non-linear, arcuate, and/or angled, and the strap can have a variable width along its length, as described above. Referring to FIG. 18, another pocket device 10*i* is shown that is similar in many respects to that described above, and which description is hereby incorporated herein by reference. The pocket 10*i* can have a pair of slots 36*i* and 38*i* that are arcuate. Thus, the slots can have broad U-shapes. The slots can be oriented with their distal ends further apart from one another, and their intermediate points closer to one another, in an hour-glass shape. The strap 42*i* can have wider ends and a narrower interior or intermediate portion. In another aspect, the slots can be oriented with their distal ends closer to one another, and their intermediate points closer to one another. The strap can have narrower ends and a wider interior or intermediate portion.

Figure 19:
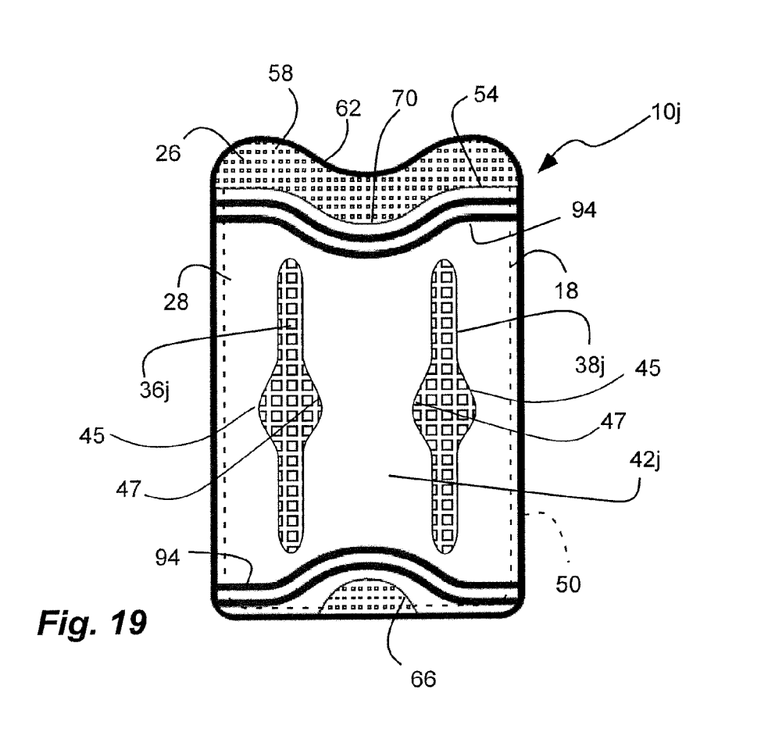
FIG. 19 is a front view of another pocket device in accordance with another embodiment of the present invention.

Referring to FIG. 19, another pocket device 10*j* is shown that is similar in many respects to that described above, and which description is hereby incorporated herein by reference. The pocket 10*j* can have a pair of slots 36*j* and 38*j*, formed in the outer panel 28 to form a strap 42*j* in the outer panel 28. In addition, the slots, outer panel, and/or the strap can have a notch formed therein to facilitate insertion of the user's finger under the strap 42*j*. An outer notch 45 formed in the outer panel 28 and the slots, and oriented to face inwardly with respect to the pocket.

Figure 20:
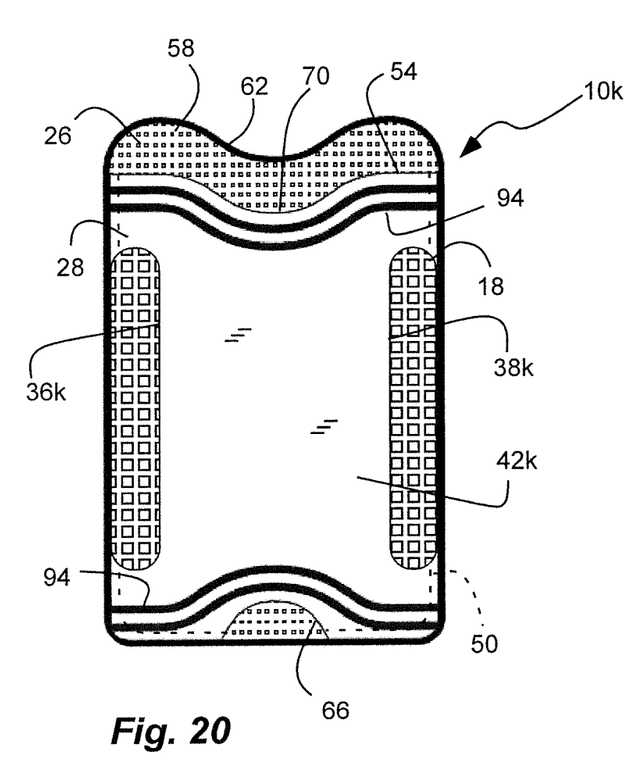
FIG. 20 is a front view of another pocket device in accordance with another embodiment of the present invention.

Referring to FIG. 20, another pocket device 10*k* is shown that is similar in many respects to that described above, and which description is hereby incorporated herein by reference. The pocket 10*k* can have a pair 36*k* and 38*k*, formed in the outer panel 28 to form a strap 42*k* in the outer panel 28. The slots 36*k* and 38*k* can be located adjacent the edges, so that the panel 28, and thus the strap 42*k*, is only coupled to the inner panel 26 at the outer corners. Thus, the strap 42 can be broader for comfort, and the slots can be located at the edges of the pocket to facilitate insertion of the user's finger.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pocket device in combination with a cellular phone and a rectangular card, the pocket device being affixed to the cellular phone and removably receiving the rectangular card therein to selectively couple the rectangular card to the cellular phone, the pocket device comprising:
   a) a pouch formed by inner and outer planer, rectangular panels and a perimeter wall extending between the panels around a majority of a perimeter of the panels, the panels and the perimeter wall being formed of silicone as a single, unitary, monolithic body;
   b) a planer, rectangular hollow formed between the panels and the perimeter wall, and removably receiving the rectangular card therein;
   c) an open end formed between short sides of the panels and extending to the hollow, and removably receiving the rectangular card therethrough;
   d) an inner finger notch formed in the short side of the inner panel adjacent the open end;
   e) an outer finger notch formed in the outer panel on an opposite short side opposite the inner notch and the open end;
   f) an adhesive disposed on an exterior surface of the inner panel and adhering the pouch to the cellular phone;
   g) an inner surface of the inner panel facing into the hollow and having a texture with a plurality of indentations or protrusions defining an outermost contact surface in contact with the rectangular card with a surface area less than a surface area of the inner panel;
   h) an inner surface of the outer panel facing into the hollow and having a texture with a plurality of indentations or protrusions defining an outermost contact surface in contact with the rectangular card with a surface area less than a surface area of the outer panel;
   i) a pair of elongated slots formed in the outer panel and extending to the hollow, the pair of elongated slots being spaced-apart and parallel with one another to form an elongated strap therebetween with opposite distal ends attached to and formed with the outer panel, the pair of elongated slots and the elongated strap being aligned parallel with a long side of the panels, the pair of elongated slots defining finger openings configured to removably receive a user's finger;
   j) the elongated strap being flexible to bend away from the outer panel and elastic to return to a flat configuration, the elongated strap having at least two positions, including:
      A) a non-use position in which the elongated strap is relaxed and planar and flush with the outer panel; and
      B) a use position in which the elongated strap is stretched and arcuate and bowed away from the outer panel configured to receive the user's finger through the pair of elongated slots and between the elongated strap and the hollow to tether the pouch, and thus the cellular phone, to the user's finger;
   k) a grip layer comprising a plurality of protrusions disposed on an external surface of the outer panel;
   l) an open area on the elongated strap and exposed by the grip layer, the open area exposing a majority of the elongated strap; and
   m) indicia disposed on the elongated strap in the open area.

2. The pocket device in accordance with claim 1, wherein the pair of elongated slots each have a length greater than half of a length of the outer panel, and less than a length of the rectangular card.

3. The pocket device in accordance with claim 1, wherein the elongated strap has a width greater than one-third of a width of the panels, and less than a width of the rectangular card.

4. The pocket device in accordance with claim 1, wherein the outer panel has a length less than a length of the inner panel, the panels having distal ends opposite the open end co-extensive with one another, and proximal ends at the open end with the proximal end of the inner panel extending beyond the proximal end of the outer panel.

5. A method for selectively tethering the cellular phone to the user's finger with the pocket device in accordance with claim 1, the method comprising:
   a) inserting the user's finger into a first of the pair of elongated slots, under the elongated strap, and out of a second of the pair of elongated slots so that the pocket, and thus the cellular phone, is carried by the user's finger, and displacing the elongated strap from the non-used position to the used position; and
   b) withdrawing the user's finger from the second of the pair of elongated slots, from under the elongated strap, and from the first of the pair of elongated slots, and allowing the elongated strap to return to the non-used position.

6. The pocket device in accordance with claim 1, wherein the elongated strap and the outer panel have a thickness of at least 0.04 inches.

7. A method for selectively coupling the rectangular card to the cellular phone with the pocket device in accordance with claim 1, the method comprising:
   a) inserting the rectangular card through the open end and into the hollow;
   b) inserting the user's finger or a user's fingernail into the outer finger notch and sliding the rectangular card out of the hollow through the open end; and
   c) inserting the user's finger or the user's fingernail between the cellular phone and the rectangular card, and withdrawing the rectangular card from the hollow.

8. A pocket device configured to be affixed to a cellular phone and configured to receive a rectangular card to selectively couple the rectangular card to the cellular phone, the pocket device comprising:
   a) a pouch formed by inner and outer planer, rectangular panels and a perimeter wall extending between the panels around a majority of a perimeter of the panels;
   b) a planer, rectangular hollow formed between the inner and outer panels and the perimeter wall, and configured to removably receiving the rectangular card therein;
   c) an open end formed between short sides of the inner and outer panels and extending to the hollow, and configured to removably receive the rectangular card therethrough;
   d) an inner finger notch formed in the short side of the inner panel adjacent the open end;
   e) an adhesive disposed on an exterior surface of the inner panel and configured to adhere the pouch to the cellular phone;
   f) a pair of elongated slots formed in the outer panel and being spaced-apart from one another to form an elongated strap therebetween with opposite distal ends attached to and formed with the outer panel, the pair of elongated slots defining finger openings configured to removably receive a user's finger;
   g) the elongated strap being flexible to bend away from the outer panel and elastic to return to a flat configuration, the elongated strap having at least two positions, including:
      i) a non-use position in which the elongated strap is relaxed and planar and flush with the outer panel; and
      ii) a use position in which the elongated strap is stretched and arcuate and bowed away from the outer panel configured to receive the user's finger through the pair of elongated slots and between the elongated strap and the hollow configured to tether the pouch, and thus the cellular phone, to the user's finger.

9. The pocket device in accordance with claim 8, further comprising:
   the inner and outer panels and the perimeter wall being formed together from silicone as a single, unitary, monolithic body.

10. The pocket device in accordance with claim 8, further comprising:
   at least one slot notch formed in at least one of the pair of elongated slots.

11. The pocket device in accordance with claim 8, further comprising:
   an inner surface of the inner panel facing into the hollow and having a texture with a plurality of indentations or protrusions defining an outermost contact surface in contact with the rectangular card with a surface area less than a surface area of the inner panel.

12. The pocket device in accordance with claim 11, further comprising:
   an inner surface of the outer panel facing into the hollow and having a texture with a plurality of indentations or protrusions defining an outermost contact surface in contact with the rectangular card with a surface area less than a surface area of the outer panel.

13. The pocket device in accordance with claim 8, wherein the pair of elongated slots is parallel with one another; the pair of elongated slots and the elongated strap being aligned parallel with a long side of the panels.

14. The pocket device in accordance with claim 8, further comprising:
   a) a grip layer comprising a plurality of protrusions disposed on an external surface of the outer panel;
   b) an open area on the elongated strap and exposed by the grip layer, the open area exposing a majority of the elongated strap; and
   c) indicia disposed on the elongated strap in the open area.

15. The pocket device in accordance with claim 8, wherein the outer panel has a length less than a length of the inner panel, the panels having distal ends opposite the open end co-extensive with one another, and proximal ends at the open end with the proximal end of the inner panel extending beyond the proximal end of the outer panel.

16. A method for selectively tethering the cellular phone to the user's finger with the pocket device in accordance with claim 8, the method comprising:
   a) inserting the user's finger into a first of the pair of elongated slots, under the elongated strap, and out of a second of the pair of elongated slots so that the pocket, and thus the cellular phone, is carried by the user's finger, and displacing the elongated strap from the non-used position to the used position; and
   b) withdrawing the user's finger from the second of the pair of elongated slots, from under the elongated strap, and from the first of the pair of elongated slots, and allowing the elongated strap to return to the non-used position.

17. The pocket device in accordance with claim 8, further comprising:
   an outer finger notch formed in the outer panel on an opposite short side opposite the inner notch and the open end.

18. A method for selectively coupling the rectangular card to the cellular phone with the pocket device in accordance with claim 17, the method comprising:
   a) inserting the rectangular card through the open end and into the hollow;
   b) inserting the user's finger or a user's fingernail into the outer finger notch and sliding the rectangular card out of the hollow through the open end; and
   c) inserting the user's finger or the user's fingernail between the cellular phone and the rectangular card, and withdrawing the rectangular card from the hollow.

19. A method for selectively coupling a rectangular card to a cellular phone, and for tethering the cellular phone, the method comprising:
   a) inserting the rectangular card into a pocket affixed to the cellular phone, the pocket comprising:
      i) a pouch formed by inner and outer planer, rectangular panels and a perimeter wall extending between the panels around a majority of a perimeter of the panels;
      ii) the inner and outer panels and the perimeter wall being formed together from silicone as a single, unitary, monolithic body;
      iii) a planer, rectangular hollow formed between the inner and outer panels and the perimeter wall, and configured to removably receiving the rectangular card therein;

iv) an open end formed between short sides of the inner and outer panels and extending to the hollow, and configured to removably receive the rectangular card therethrough;
v) an inner finger notch formed in the short side of the inner panel adjacent the open end;
vi) an adhesive disposed on an exterior surface of the inner panel and configured to adhere the pouch to the cellular phone;
vii) a pair of elongated slots formed in the outer panel and extending to the hollow, the pair of elongated slots being spaced-apart from one another to form an elongated strap therebetween with opposite distal ends attached to and formed with the outer panel, the pair of elongated slots defining finger openings configured to removably receive a user's finger;
viii) the elongated strap being flexible to bend away from the outer panel and elastic to return to a flat configuration, the elongated strap having at least two positions, including:
  A) a non-use position in which the elongated strap is relaxed and planar and flush with the outer panel; and
  B) a use position in which the elongated strap is stretched and arcuate and bowed away from the outer panel configured to receive the user's finger through the pair of elongated slots and between the elongated strap and the hollow configured to tether the pouch, and thus the cellular phone, to the user's finger;
b) inserting the user's finger into a first of the pair of elongated slots, under the elongated strap, and out of a second of the pair of elongated slots so that the pocket, and thus the cellular phone, is carried by the user's finger, and displacing the elongated strap from the non-used position to the used position; and
c) withdrawing the user's finger from the second of the pair of elongated slots, from under the elongated strap, and from the first of the pair of elongated slots, and allowing the elongated strap to return to the non-used position.

20. The method in accordance with claim 19, further comprising:
a) inserting the user's finger or a user's fingernail into an outer finger notch formed in the outer panel on an opposite short side opposite the inner notch and the open end, and sliding the rectangular card out of the hollow through the open end; and
b) inserting the user's finger or the user's fingernail between the cellular phone and the rectangular card, and withdrawing the rectangular card from the hollow.

\* \* \* \* \*